No. 896,723. PATENTED AUG. 25, 1908.
C. L. HOFF.
TREAD GRIP FOR VEHICLE TIRES.
APPLICATION FILED MAR. 1, 1907.
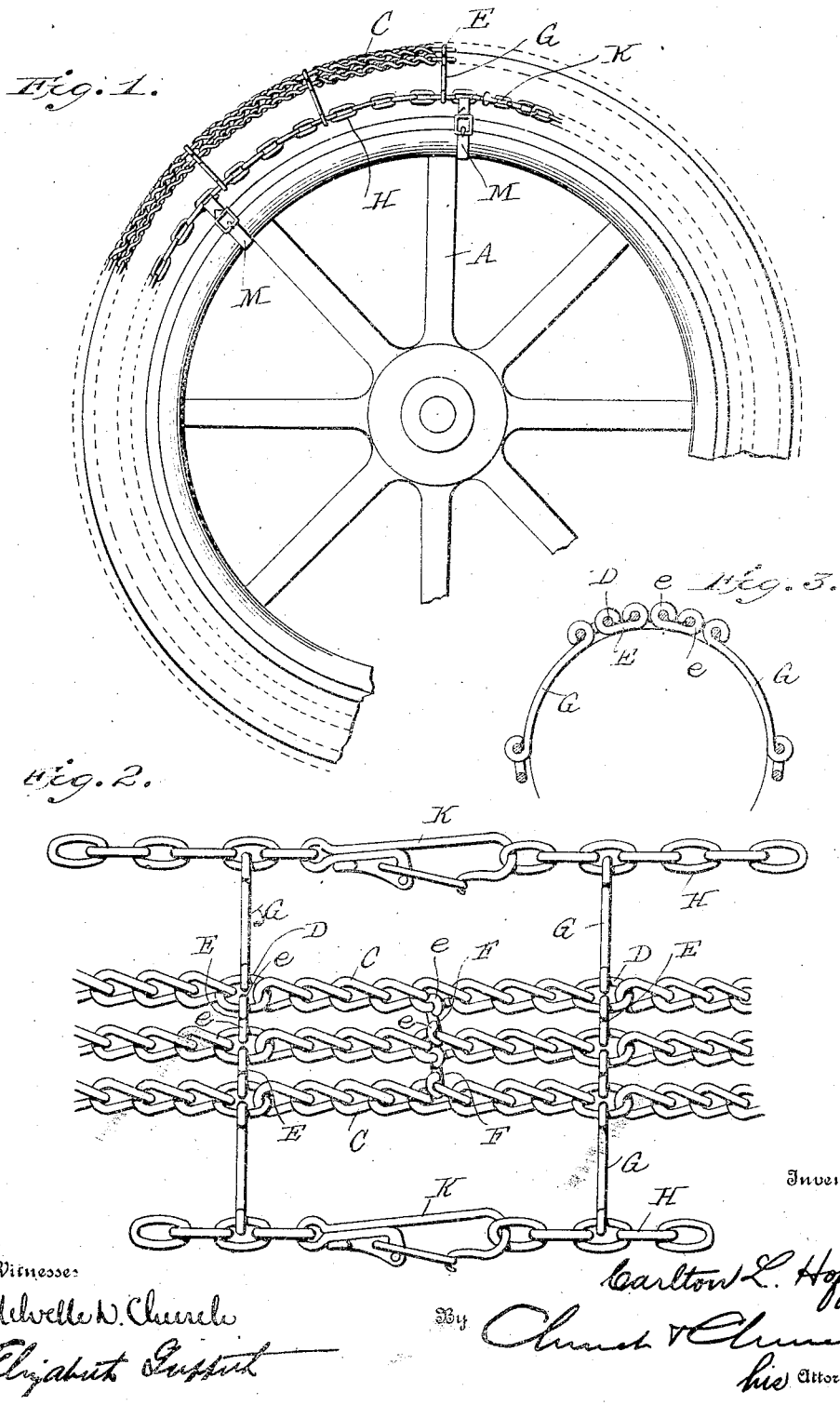

UNITED STATES PATENT OFFICE.

CARLTON L. HOFF, OF YORK, PENNSYLVANIA.

TREAD-GRIP FOR VEHICLE-TIRES.

No. 896,728.  Specification of Letters Patent.  Patented Aug. 25, 1908.

Application filed March 1, 1907. Serial No. 360,025.

*To all whom it may concern:*

Be it known that I, CARLTON L. HOFF, of York, in the county of York, State of Pennsylvania, have invented a certain new and useful Improvement in Tread - Grips for Vehicle-Tires; and I do hereby declare the following to be a full, clear, and exact description of the same, reference being had to the accompanying drawings, forming a part of this specification, and to the figures and letters of reference marked thereon.

This invention relates to detachable tread-grip anti-slipping and anti-skidding devices for vehicle wheels. Devices of this character are particularly applicable to vehicle wheels having rubber or pneumatic tires and the object of the invention is to produce a device of moderate cost and high efficiency.

A further object is to provide a device capable, under certain conditions, of serving as a protecting armor and wear surface for the tread portion of the tire.

The invention consists in certain novel details of construction and combinations and arrangements of parts all as will be now described and pointed out particularly in the appended claims.

In the accompanying drawings—Figure 1 is a side elevation partly broken away and partly diagrammatic, of a wheel having a pneumatic tire and a tread-grip embodying the present invention. Fig. 2 is a plan view of a short section of the tread-grip extended. Fig. 3 is a diagrammatic cross section through a tire and tread-grip as shown in Fig. 1.

Like letters of reference in the several figures indicate the same parts.

The vehicle wheel which may be of any ordinary or preferred type or character is indicated by the letter A, but as shown, it embodies an ordinary pneumatic tire. The tread-grip forming the novel subject matter of the present invention is composed essentially of separate tread chains extending around the tire substantially concentric to the axis of the wheel and suitable connecting links between the chains at spaced intervals.

The actual wear or tread portion of the grip is composed of a plurality, preferably three separate reaches of chain C of such size or length as to fit the tread portion of the tire with a fair degree of accuracy, although it will be understood that a tight fit is not essential nor on the other hand is a tight fit when the tire is fully inflated objectionable.

The number of separate reaches of chain may be made sufficient to support the surface of the tire out of contact with the road surface where it is desired that the grip shall also form the wear face of the tire, or a less number of chains may be employed where the object is only to prevent slipping or skidding, but in all cases the tread chains extend entirely around the wheel on the tread portion so as to lie between the tire and roadway at every point in the angular movement or rotation of the wheel.

The peripheral or tread chains are preferably, though not necessarily, each endless and while each reach is separate from the other the chains are connected at spaced intervals by links or hooks whereby their general relative positions are maintained. The chains as a whole are preferably held in place by lateral links or hooks connected to side chains lying at each side of and within the greatest diameter of the tire. Straps passing inside of the rim may be employed as a securing means.

The chains C are preferably composed of ordinary twisted links as shown and at the points where the connecting links are applied a single link may be left untwisted, thus untwisted links are left at D and the connecting links E take into the said untwisted links, but this is not essential as the connecting links may take into the ordinary twisted links as shown at F. The connecting links E and F are both preferably formed of metal rod having eyes e at each end and hence may be made long or short as desired. Where the chain links are twisted as at the links F the eyes should be turned at an angle to each other so as to surround the bars of the chain links at substantially right angles.

The links G connecting the tread chains C and side chain H are preferably relatively long single links, but it is obvious that more than one link may be employed if desired. Said side chains H are preferably composed of ordinary straight links and are provided with locks or locking hooks K of well known construction, whereby the continuity of these chains may be temporarily broken for applying or removing the tread-grip in the well known way.

The straps M extend from one side to the other around the inner side of the rim and will form a positive means for preventing the grip from traveling around on the tire, inasmuch as in the present structure it is not necessary or desirable that the tire and grip shall travel with relation to each other because wear will be evenly distributed without such traveling action.

In the arrangement of connecting links shown, the tread chains are connected together at a greater number of points than the points of connection between the tread chains and side chains or straps but said connections are always spaced apart a sufficient distance to permit of an independent lateral movement of each chain thus each tread-chain is free to conform to irregularities and to position itself independently of the others.

The provision of continuous peripheral or tread-chains insures the interposition of the grip members between the tire and road surface at every point, it prevents either slipping or skidding in either an angular or sidewise direction and effectually overcomes any rolling action of the chain on the tire. The resistance to skidding is very pronounced because of the fact that the skidding movements take place transversely of the tread chains and the latter are free to act and position themselves independently of each other so as to conform to irregularities and insure a secure grip on the road surface under all conditions.

Having thus described my invention what I claim as new and desire to secure by Letters Patent, is:—

1. A tread-grip for vehicle tires embodying a plurality of substantially parallel tread chains extending longitudinally of the tire and formed of twisted links and straight links at spaced intervals, links connecting the straight links of adjacent chains, side chains and links connecting said side chains and edge tread chains at spaced intervals.

2. A tread-grip for vehicle tires embodying a plurality of substantially parallel tread chains extending longitudinally of the tire and formed of twisted links and links connecting adjacent chains formed with eyes twisted with relation to each other to engage the side bars of the twisted chain links at substantially right angles thereto.

CARLTON L. HOFF.

Witnesses:
Jos. F. Sample,
Andrew J. Hershey.